UNITED STATES PATENT OFFICE.

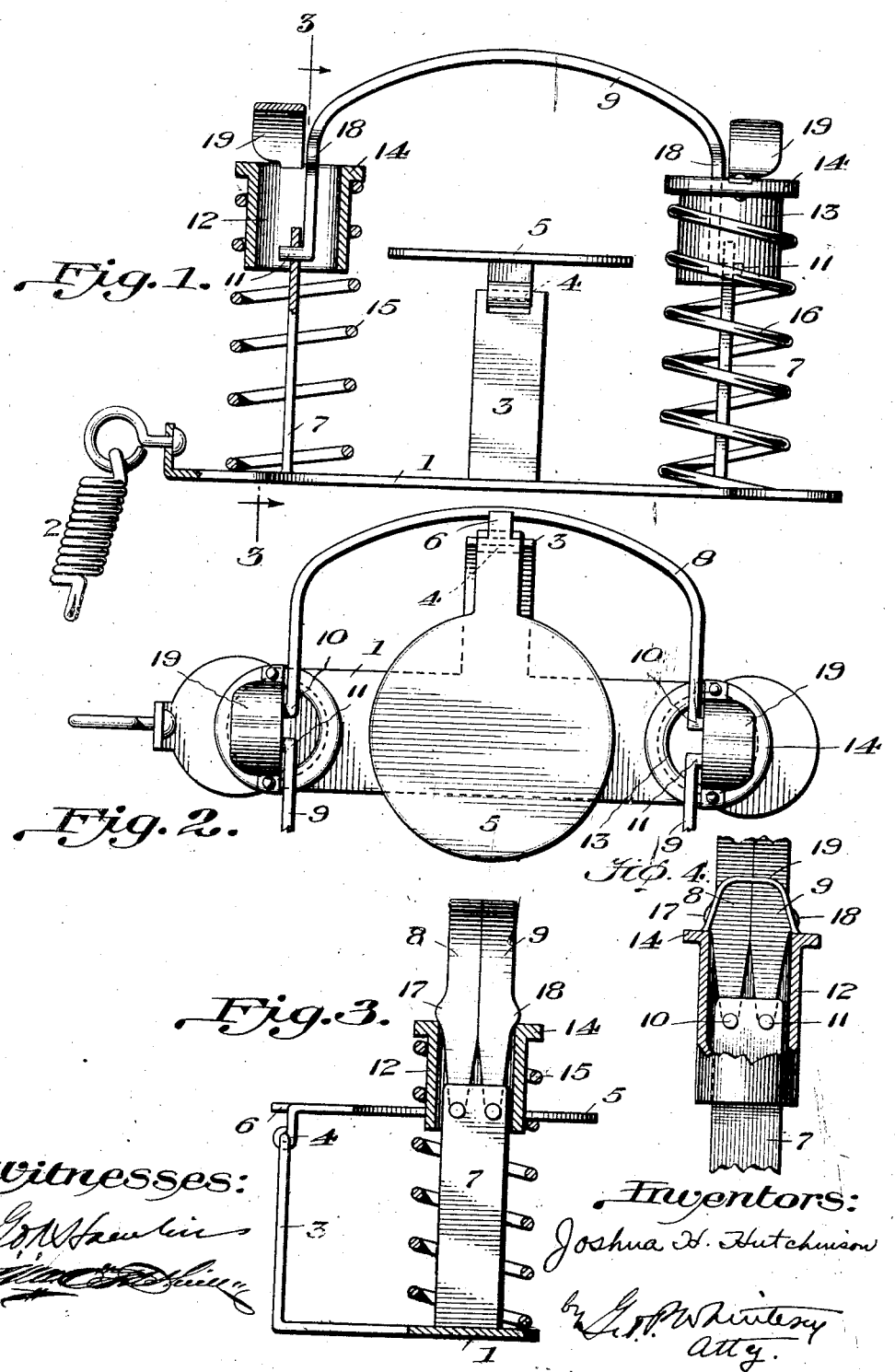

JOSHUA H. HUTCHINSON, OF CEDARVILLE, CALIFORNIA.

JAW-TRAP.

1,100,977.   Specification of Letters Patent.   Patented June 23, 1914.

Application filed August 22, 1913. Serial No. 786,142.

*To all whom it may concern:*

Be it known that I, JOSHUA H. HUTCHINSON, a citizen of the United States, residing at Cedarville, county of Modoc, State of California, have invented certain new and useful Improvements in Jaw-Traps, of which the following is a specification.

This invention relates to jaw traps.

My object is to provide a jaw trap having improved spring means for actuating the jaws thereof and, further, improvements whereby the animal will be prevented from so clogging the jaws by scratching gravel or pieces of frozen dirt and small sticks on the trap that the jaws of the trap, when the trap is sprung, will not properly catch the animal.

My invention is particularly designed to catch wolves, but its use is not thus restricted. The wolf often scratches gravel, small sticks or pieces of frozen dirt onto a trap and thereby prevents the jaws of the ordinary spring trap from acting properly when the trap is sprung. My invention prevents the trap from being rendered inoperative by such action on the part of the animal.

A further object is to provide a jaw trap wherein improved means is provided by which the pivoted jaws are prevented from coming loose from the frame when the trap is sprung and to combine therewith, in a new manner, coil springs for actuating the jaws.

The invention is set forth hereafter and the novel features and combinations thereof are recited in the appended claims.

In the accompanying drawings:—Figure 1 is a front elevation, one of the sleeves being shown in section and the trap represented as sprung, but with the pan in raised position; Fig. 2, a plan view showing the trap set; Fig. 3, a section on line 3—3, Fig. 1, the pan being raised; and Fig. 4, a detail showing one of the sleeves and its protective top.

The frame 1 may be provided with a coil spring 2 to which the usual chain for anchoring the trap is connected, such spring cushioning the jerks imparted to the trap by the animal when the latter is caught, thus preventing the animal from tearing itself loose or detaching the trap from its anchorage. To a portion 3 of the frame is pivoted at 4, a pan 5 having a trigger 6. Rising from the frame are the standards 7 to which the jaws 8 and 9 are pivoted at 10 and 11, respectively, said jaws being adapted to spread downwardly and one of them to be engaged by the trigger 6. Sleeves 12, 13, loosely encircle the ends of the jaws 8, 9, and are provided with circumferential flanges 14. Surrounding and preferably rather snugly embracing the sleeves 12, 13, are stout coil springs 15, 16, whose lower ends are seated on frame 1 and whose upper ends bear against the flanges 14. The lower and pivoted parts of the jaws 8, 9, are, as shown in Fig. 3, tapered, but their combined width is nearly the same as the internal diameters of the sleeves 12, 13. The jaws are provided with shoulders 17, 18, which engage the upper ends of the respective sleeves 12, 13, to thereby limit the upward throw of the said sleeves when the trap is sprung, as shown in Fig. 3. The tapered or inclined lower ends of the jaws permit the sleeves to be forced down against the action of springs 15, 16, when setting the trap, as shown in Fig. 2, the springs then being under considerable compression so that when the pan 5 is touched or stepped upon by the animal, the trigger 6 is released from the jaw 8 and the springs 15, 16 then snap the sleeves 12, 13, upwardly and these sleeves by their engagement with the tapered ends of the jaws, instantaneously close the jaws, as shown in Fig. 3. The springs are not only prevented from buckling by reason of their encircling the sleeves 12, 13, but these sleeves, when the trap is sprung, immediately house the pivots 10, 11, and by the coöperation of the sleeves and the ends of the jaws, the pivots 10, 11, are prevented from being sprung out of their holes in the standards 7, no matter how hard the animal may work to pull itself loose from the trap.

To prevent an animal like the wolf from scratching gravel, small sticks and pieces of frozen dirt onto the trap and into the sleeves 12, 13, which would result in clogging the sleeves and the jaws so that the latter could not close, I provide on the upper ends of the sleeves hoods or guards 19 which are preferably arched and cover all of the upper end of the sleeves except that part which is necessary to permit the entrance of the ends of the jaws and their operation. These guards prevent small sticks, gravel and bits of frozen earth from lodging within the sleeves.

Having thus described my invention, what I claim as new and desire to secure by Letters Patent, is:—

1. In a trap, the combination with a frame having standards, of jaws pivoted to said standards, flanged tubular sleeves surrounding said standards and the pivotal ends of said jaws and maintaining constant engagement with said standards, coil springs abutting between the frame and the flanges on said sleeves, and a trip and lock for said jaws.

2. In a trap, the combination with a frame having standards, of jaws pivoted to said standards, sleeves surrounding the pivotal parts of said jaws, guards at the upper ends of said sleeves adapted to cover the pivots when the trap is set and exclude foreign material therefrom, coil springs surrounding said standards and sleeves, and a lock and trip for said jaws.

In testimony whereof, I hereunto affix my signature in the presence of two witnesses.

JOSHUA H. HUTCHINSON.

Witnesses:
F. E. BUSH,
N. M. LESTER.